(12) United States Patent
Nagata (10) Patent No.: US 12,143,055 B2
(45) Date of Patent: Nov. 12, 2024

(54) ABNORMALITY MONITORING APPARATUS (71) Applicant: DENSO CORPORATION, Kariya (JP)

(72) Inventor: Hiromitsu Nagata, Kariya (JP)

(73) Assignee: DENSO CORPORATION, Kariya (JP)

( * ) Notice: Subject to any disclaimer, the term of this patent is extended or adjusted under 35 U.S.C. 154(b) by 163 days.

(21) Appl. No.: 17/890,382

(22) Filed: Aug. 18, 2022

(65) Prior Publication Data

US 2022/0393624 A1 Dec. 8, 2022

Related U.S. Application Data

(63) Continuation of application No. PCT/JP2021/005877, filed on Feb. 17, 2021.

(30) Foreign Application Priority Data

Feb. 20, 2020 (JP) .................................. 2020-027044

(51) Int. Cl.
*H02P 7/03* (2016.01)
*F16H 61/12* (2010.01)
*F16H 61/32* (2006.01)

(52) U.S. Cl.
CPC ................ *H02P 7/04* (2016.02); *F16H 61/12* (2013.01); *F16H 2061/1288* (2013.01); *F16H 61/32* (2013.01); *F16H 2061/326* (2013.01)

(58) Field of Classification Search
CPC .......... H02P 7/04; H02P 7/281; H02P 29/024; F16H 61/12; F16H 61/32; F16H 2061/1288; F16H 2061/326

USPC .................. 318/400.29, 400.26, 400.01, 700
See application file for complete search history.

(56) References Cited

U.S. PATENT DOCUMENTS

| | | | | |
|---|---|---|---|---|
| 5,691,611 | A * | 11/1997 | Kojima | G01R 31/2829 |
| | | | | 318/815 |
| 9,647,603 | B2 * | 5/2017 | Koseki | H02P 29/0241 |
| 10,291,171 | B2 * | 5/2019 | Moritake | H02P 29/0241 |
| 2020/0271222 | A1 | 8/2020 | Kamio | |
| 2023/0064107 | A1 | 3/2023 | Shigemori et al. | |

FOREIGN PATENT DOCUMENTS

JP 2018-7454 1/2018

* cited by examiner

*Primary Examiner* — David Luo
(74) *Attorney, Agent, or Firm* — Nixon & Vanderhye P.C.

(57) ABSTRACT

An abnormality monitoring apparatus includes a drive circuit unit, a current detection unit, a current cutoff unit, a first control unit, and a second control unit. The drive circuit unit switches an energization to the motor winding. The current detection unit detects a motor current, which is a current flowing through the motor winding. The current cutoff unit cuts off the motor current. The first control unit has an energization control unit for controlling energization to the motor winding and an energization state notification unit for outputting an energization state signal according to an energization command. The second control unit is provided separately from the first control unit and has an abnormality monitoring unit configured to monitor an abnormality based on a detection value of the current detection unit and an energization state signal so as to perform fail-safe measure according to a monitoring result.

4 Claims, 7 Drawing Sheets

| SGN_M# | SGN_S# | SW# |
|---|---|---|
| 0 | 0 | OFF |
| 1 | 0 | ON |
| 0 | 1 | ON |
| 1 | 1 | OFF |

FIG. 7

ABNORMALITY MONITORING APPARATUS

CROSS REFERENCE TO RELATED APPLICATIONS

This application is a continuation application of International Patent Application No. PCT/JP2021/005877 filed on Feb. 17, 2021, which designated the U.S. and based on and claims the benefits of priority of Japanese Patent Application No. 2020-027044 filed on Feb. 20, 2020. The entire disclosure of all of the above applications is incorporated herein by reference.

TECHNICAL FIELD

The present disclosure relates to an abnormality monitoring apparatus.

BACKGROUND

Conventionally, a shift range switching device switches a shift range by controlling a motor in accordance with a shift range switching request from a driver.

SUMMARY

An object of the present disclosure is to provide an abnormality monitoring apparatus capable of performing appropriate fail-safe measure when an abnormality occurs.

An abnormality monitoring apparatus of the present disclosure is an abnormality monitoring apparatus that monitors an energization abnormality of a motor having a motor winding, and includes a drive circuit unit, a current detection unit, a first control unit, and a second control unit. The drive circuit unit switches an energization to the motor winding. The current detection unit detects a motor current, which is a current flowing through the motor winding. The current cutoff unit can cut off the motor current.

The first control unit has an energization control unit that controls energization of the motor winding, and an energization state notification unit that outputs an energization state signal according to an energization command state. The second control unit is provided separately from the first control unit and has an abnormality monitoring unit configured to monitor an abnormality based on a detection value of the current detection unit and an energization state signal so as to perform fail-safe measure according to a monitoring result.

BRIEF DESCRIPTION OF DRAWINGS

The above and other objects, features and advantages of the present disclosure will become more apparent from the following detailed description made with reference to the accompanying drawings.

In the drawings.

DETAILED DESCRIPTION

In an assumable example, a shift range switching device switches a shift range by controlling a motor in accordance with a shift range switching request from a driver. For example, when a target shift range and an actual range do not match, a fail-safe measure is performed.

For example, when a drive control unit and an abnormality monitoring unit are configured by a same microcomputer, if the microcomputer itself fails, abnormality detection cannot be performed. An object of the present disclosure is to provide an abnormality monitoring apparatus capable of performing appropriate fail-safe measures when an abnormality occurs.

An abnormality monitoring apparatus of the present disclosure is an abnormality monitoring apparatus that monitors an energization abnormality of a motor having a motor winding, and includes a drive circuit unit, a current detection unit, a first control unit, and a second control unit. The drive circuit unit switches an energization to the motor winding. The current detection unit detects a motor current, which is a current flowing through the motor winding. The current cutoff unit can cut off the motor current.

The first control unit has an energization control unit that controls energization of the motor winding, and an energization state notification unit that outputs an energization state signal according to an energization command state. The second control unit is provided separately from the first control unit and has an abnormality monitoring unit configured to monitor an abnormality based on a detection value of the current detection unit and an energization state signal so as to perform fail-safe measure according to a monitoring result. By monitoring the abnormality by the second control unit provided separately from the first control unit, even if an abnormality occurs in the first control unit, the fail-safe measure can be appropriately performed.

Hereinafter, an abnormality monitoring apparatus will be described with reference to the drawings. Hereinafter, in a plurality of embodiments, a substantially equivalent configuration will be denoted by an identical reference, and explanation thereof will be omitted.

First Embodiment

Figure 1:
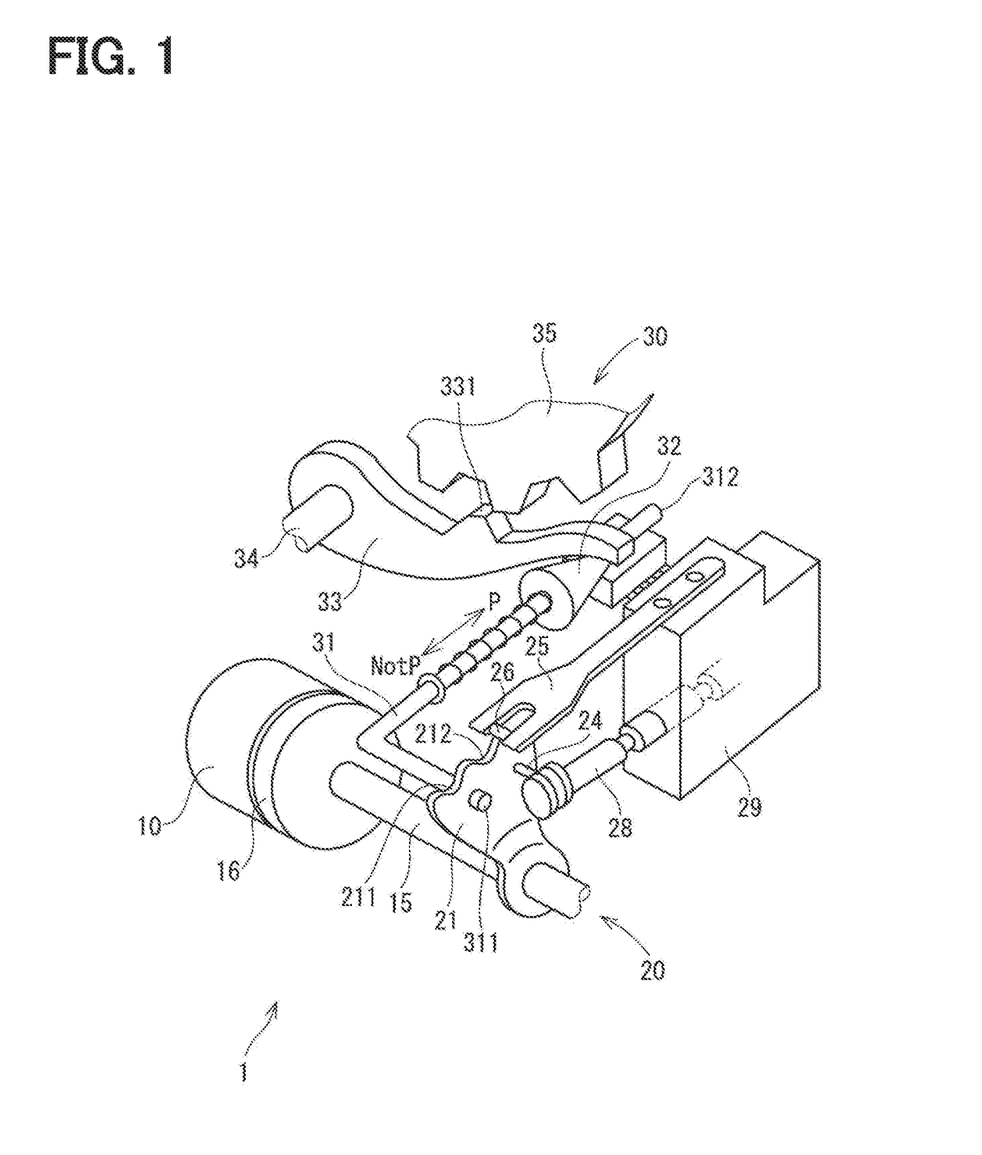
FIG. 1 is a perspective view showing a shift-by-wire system according to a first embodiment.
Figure 2:
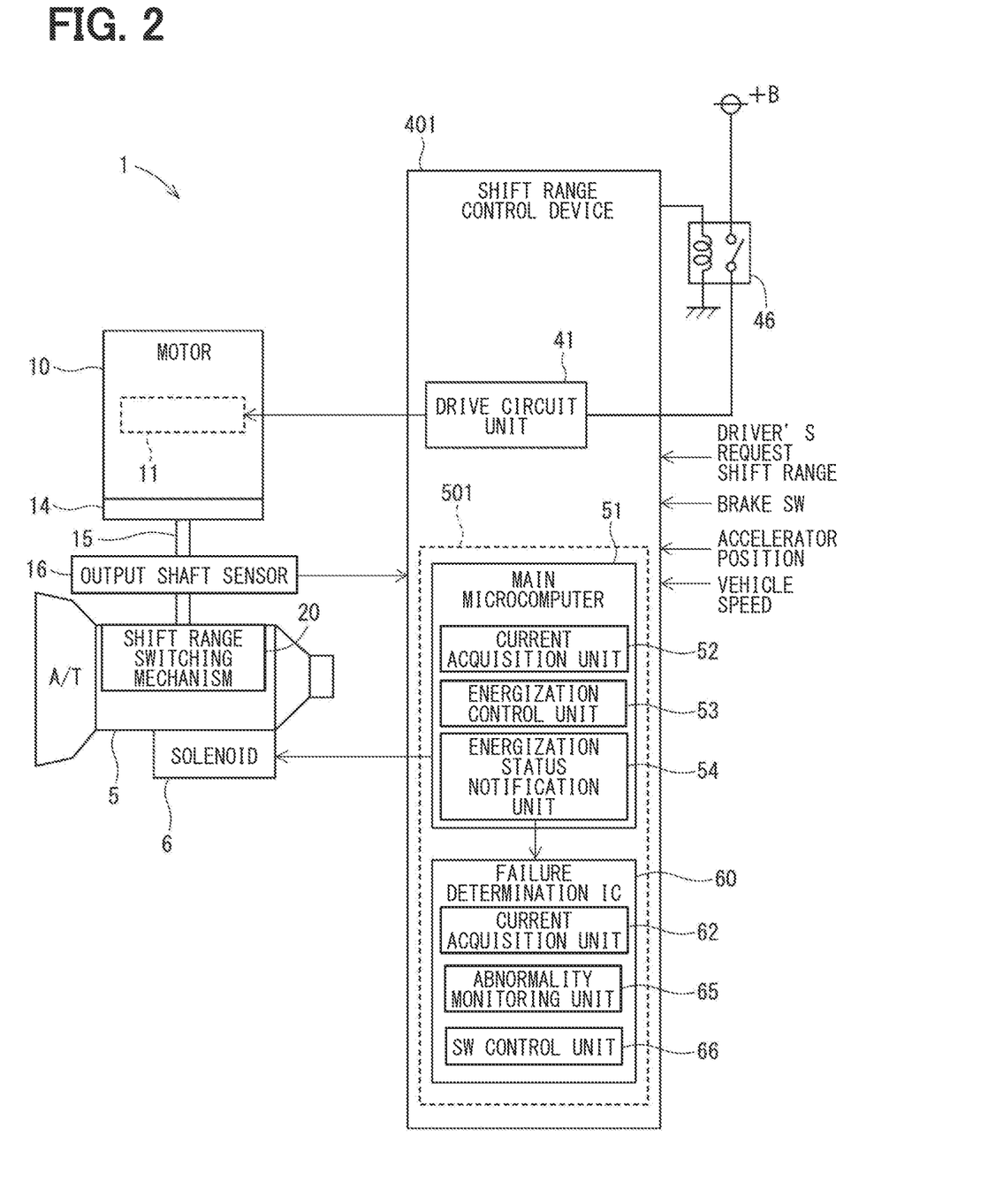
FIG. 2 is a diagram showing a schematic configuration of the shift-by-wire system according to the first embodiment.
Figure 3:
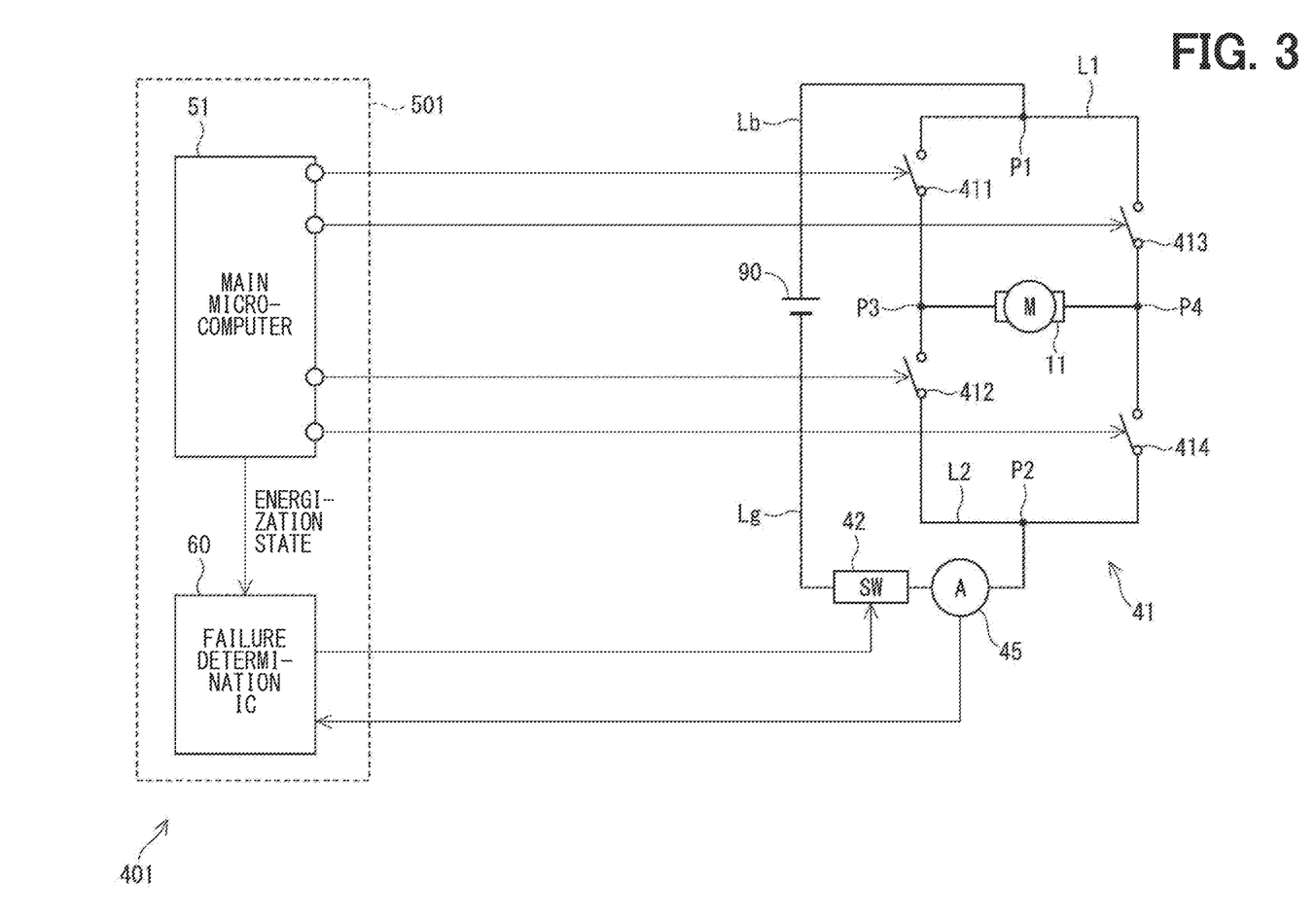
FIG. 3 is a circuit diagram showing a shift range control device according to the first embodiment.

A first embodiment is shown in FIGS. 1 to 4. As shown in FIGS. 1 to 3, a shift-by-wire system 1 as a motor drive system includes a motor 10 as an actuator, a shift range switching mechanism 20, a parking lock mechanism 30, and a shift range control device 401 as an abnormality monitoring control apparatus, and the like.

The motor 10 rotates when receiving electric power from a battery 90 as a power supply mounted on a not-shown vehicle to function as a drive source of the shift range switching mechanism 20. The motor 10 of the present embodiment is a DC motor with a brush and has a motor winding 11. A speed reducer 14 is provided between a motor shaft of the motor 10 and an output shaft 15 and outputs the rotation of the motor 10 to the output shaft 15 after speed reduction. The rotation of the motor 10 is thus transmitted to the shift range switching mechanism 20. An output shaft sensor 16 for detecting an angle of the output shaft 15 is provided on the output shaft 15. The output shaft sensor 16 is, for example, a potentiometer.

As shown in FIG. 1, the shift range switching mechanism 20 has a detent plate 21, a detent spring 25 as an urging member, a detent roller 26, and the like, and transmits a rotational driving force output from the speed reducer 14 to a manual valve 28 and a parking lock mechanism 30.

The detent plate 21 is fixed to the output shaft 15 and driven by the motor 10. The detent plate 21 has a pin 24 protruding in parallel with the output shaft 15. The pin 24 is connected to the manual valve 28. The detent plate 21 is driven by the motor 10, whereby the manual valve 28 reciprocates in an axial direction. That is, the shift range switching mechanism 20 converts the rotational motion of the motor 10 into a linear motion and transmits the linear motion to the manual valve 28. The manual valve 28 is provided on a valve body 29. When the manual valve 28 reciprocates in the axial direction, a hydraulic supply path to a hydraulic clutch (not shown) is switched, and an engagement state of the hydraulic clutch is switched. In this way, the shift range is switched.

The detent plate 21 is provided with two valley portions 211 and 212 at portions close to the detent spring 25. In the present embodiment, the valley portion 211 corresponds to a P range, and the valley portion 212 corresponds to a NotP range, which is a range other than the P range.

The detent spring 25 is an elastically deformable plate-like member, and is provided with a detent roller 26 at a tip of the detent spring 25. The detent spring 25 urges the detent roller 26 toward a rotation center side of the detent plate 21, that is, a side that fits into the valley portions 211 and 212. When a rotational force equal to or greater than a predetermined force is applied to the detent plate 21, the detent spring 25 is elastically deformed, and the detent roller 26 moves between the valley portions 211 and 212. When the detent roller 26 is fitted into any one of the valley portions 211 and 212, the swinging motion of the detent plate 21 is regulated, the axial position of the manual valve 28 and the state of the parking lock mechanism 30 are determined, and the shift range of an automatic transmission 5 is fixed. The detent roller 26 fits into the valley portion 211 when the shift range is the P range, and fits into the valley portion 212 when the shift range is the Not P range.

The parking lock mechanism 30 includes a parking rod 31, a conical member 32, a parking lock pawl 33, a shaft part 34 and a parking gear 35. The parking rod 31 is formed in a substantially L-shape. The parking rod 31 is fixed to the detent plate 21 on a side of one end 311. The conical member 32 is provided to the other end 312 of the parking rod 31. The conical member 32 is formed to reduce in diameter toward the other end 312.

The parking lock pawl 33 is configured to abut on a conical surface of the conical member 32 and to pivot around the shaft part 34, and the parking lock pawl 33 has a protrusion 331 on the side of the parking gear 35. The protrusion 331 is configured to mesh with the parking gear 35. When the detent plate 21 rotates in the reverse rotation direction and the conical member 32 moves in a P direction, the parking lock pawl 33 is pushed up, and the protrusion 331 meshes with the parking gear 35. On the other hand, when the detent plate 21 rotates in the forward rotational direction and the conical member 32 moves in a NotP direction, the engagement between the protrusion 331 and the parking gear 35 is released.

The parking gear 35 is provided to an axle (not shown) and is enabled to mesh with the protrusion 331 of the parking lock pawl 33. When the parking gear 35 meshes with the protrusion 331, rotation of the axle is restricted. When the shift range is the NotP range, the parking gear 35 is not locked by the parking lock pawl 33 and the rotation of the axle is not restricted by the parking lock mechanism 30. When the shift range is the P range, the parking gear 35 is locked by the parking lock pawl 33 and the rotation of the axle is restricted.

As shown in FIGS. 2 and 3, the shift range control device 401 includes a drive circuit unit 41, a control unit 501, and the like. As shown in FIG. 3, the drive circuit unit 41 has four drive elements 411 to 414 and constitutes an H-bridge circuit. The drive elements 411 to 414 of the present embodiment are MOSFETs, but may be IGBTs or the like.

The high potential sides of the drive elements 411 and 413 are connected by a high potential side connection line L1. The high potential side connection line L1 is connected to a feeding line Lb connected to a high potential side of the battery 90 at a connection point P1. Further, the low potential sides of the drive elements 412 and 414 are connected by a low potential side connection line L2. The low potential side connection line L2 is connected to the ground wiring Lg at a connection point P2. The motor winding 11 is connected to a connection point P3 of the drive elements 411 and 412 and a connection point P4 of the drive elements 413 and 414.

When the motor 10 is rotated in a forward direction, the drive elements 411 and 414 are turned on. When the motor 10 is rotated in a reverse direction, the drive elements 412 and 413 are turned on. In the present embodiment, when the shift range is switched from the P range to the notP range, the motor 10 is rotated in the forward direction, and when the shift range is switched from the notP range to the P range, the motor 10 is rotated in the reverse direction. Hereinafter, switching the shift range from the P range to the notP range is referred to as "remove from P", and switching the shift range from the notP range to the P range is referred to as "put in P".

A current cutoff unit 42 is connected to the ground wiring Lg. The current cutoff unit 42 is used for fail-safe, is normally turned on, and is turned off by a failure determination IC 60 when an abnormality occurs. IC means an integrated circuit. A current sensor 45 is connected to the ground wiring Lg and detects the motor current Im, which is the current of the motor winding 11. In the figure, the current cutoff unit 42 is referred to as "SW". The current sensor 45 may be provided at any position where the motor current Im can be detected, such as on the high potential side of the drive circuit unit 41 or between the motor winding 11 and the drive circuit unit 41.

The control unit 501 is mainly composed of a microcomputer and the like, and internally includes, although not shown in the figure, a CPU, a ROM, a RAM, an I/O, a bus line for connecting these components, and the like. Each processing executed by each of the control unit 501 may be software processing or may be hardware processing. The software processing may be implemented by causing the CPU to execute a program. The program may be stored beforehand in a memory device such as a ROM, that is, in a computer-readable, non-transitory, tangible storage medium. The hardware processing may be implemented by a special purpose electronic circuit. The same applies to the control unit 502 of the embodiment described later.

The control unit 501 has a main microcomputer 51 as a first control unit, a failure determination IC 60 as a second control unit, and the like. The main microcomputer 51 has a current acquisition unit 52, an energization control unit 53, an energization state notification unit 54, and the like as functional blocks. The current acquisition unit 52 acquires a detected value of the current sensor 45. The energization control unit 53 controls the on/off operation of the drive elements 411 to 414, and controls the energization of the motor winding 11 to control the drive of the motor 10.

The energization state notification unit 54 notifies the failure determination IC 60 of an energization state signal corresponding to an energization command state of the main microcomputer 51. In the present embodiment, the energization state notification unit 54 notifies the failure determination IC 60 of the energization command state by changing a duty of an energization state signal. Specifically, when an energization on to the motor 10 is instructed, the duty is set to a value X1 (for example, 30%), when an energization off to the motor 10 is instructed, the duty is set to a value X2 (for example, 60%), and when a microcomputer failure has occurred, the duty is set to a value X3 (for example, 0% or 100%). A state in which a duty of 0% or 100% is output due to a wiring abnormality, a microcomputer failure, or the like is a state in which an energization command cannot be instructed, and is included in a concept of "energization state signal according to the energization command state".

The failure determination IC 60 is composed of an IC simpler than the main microcomputer 51, but a microcomputer similar to the main microcomputer 51 may be used. The failure determination IC 60 has a current acquisition unit 62, an abnormality monitoring unit 65, and a switch control unit 66 as functional blocks. The current acquisition unit 62 acquires a detected value of the current sensor 45. The abnormality monitoring unit 65 performs abnormality monitoring based on the detection value of the current sensor 45 and the energization state signal acquired from the main microcomputer 51. When the switch control unit 66 detects an energization abnormality, the switch control unit 66 turns off the current cutoff unit 42. By turning off the current cutoff unit 42, the energization of the motor winding 11 is cut off.

Figure 4:
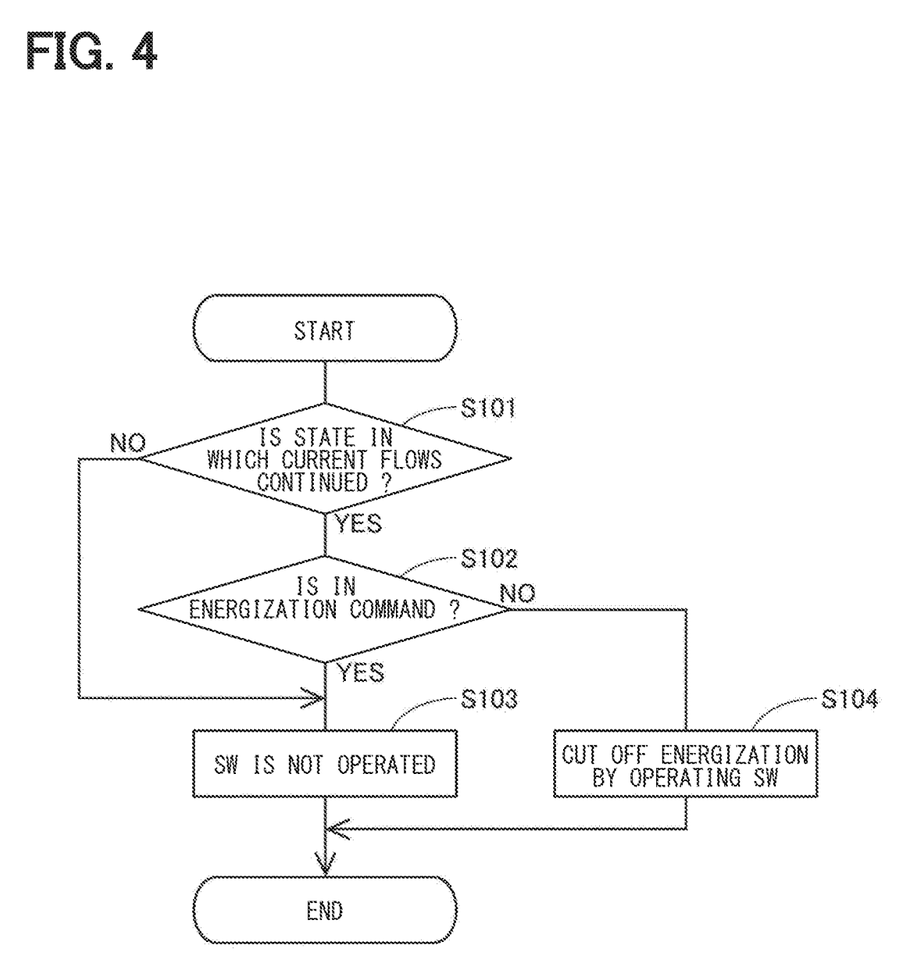
FIG. 4 is a flowchart illustrating an abnormality monitoring process according to the first embodiment.

The abnormality monitoring process according to the present embodiment will be described with reference to the flowchart in FIG. 4. This process is executed in the failure determination IC 60 at a predetermined cycle. Hereinafter, "step" in step S101 is omitted, and is simply referred to as a symbol "S." The same applies to the other steps.

In S101, the failure determination IC 60 determines whether or not the state in which the current is flowing through the motor winding 11 continues for a continuation determination time T or more based on the current detection signal acquired from the current sensor 45. The continuation determination time T is set to an arbitrary time that is shorter than the time required for range switching and is such that erroneous determination due to noise or the like does not occur. If the motor winding 11 is not energized, or if it is determined that the energization time of the motor winding 11 is less than the continuation determination time T (S101: NO), the process proceeds to S103 and the current cutoff unit 42 is not operated. That is, the on state of the current cutoff unit 42 is maintained. When it is determined that the energization time of the motor winding 11 is equal to or longer than the continuation determination time T (S101: YES), the process proceeds to S102.

In S102, the failure determination IC 60 determines whether or not the main microcomputer 51 is in the energization command. In the present embodiment, when the duty of the energization state signal acquired from the main microcomputer 51 is the value X1, it is determined that the energization command is in progress. When it is determined that the main microcomputer 51 is in the energization command (S102: YES), that is, when the duty of the energization state signal is the value X1, the process proceeds to S103 and the current cutoff unit 42 is not operated. In this case, since the main microcomputer 51 commands the motor winding 11 to be energized, a current is flowing through the motor winding 11, and the main microcomputer 51 is in normal. Therefore, the current cutoff unit 42 is maintained in the ON state, and the energization of the motor winding 11 is continued. When it is determined that the main microcomputer 51 is not in the energization command (S102: NO), that is, when the duty of the energization state signal is other than the value X1, the process proceeds to S104.

In S104, the failure determination IC 60 cuts off the energization to the motor winding 11 by turning off the current cutoff unit 42. Here, although the main microcomputer 51 does not control the motor winding 11 to be energized, the current is flowing through the motor winding 11, so that the energization to the motor winding 11 is cut. Therefore, it is possible to prevent the shift range from being switched due to unintended energization.

As described above, the shift range control device 401 of the present embodiment can monitor an energization abnormality of the motor 10 having the motor winding 11, and has the drive circuit unit 41, the current sensor 45, the current cutoff unit 42, the main microcomputer 51, and the failure determination IC 60. The drive circuit unit 41 switches the energization of the motor winding 11. The current sensor 45 detects a motor current Im, which is a current flowing through the motor winding 11. The current cutoff unit 42 can cut off the motor current Im.

The main microcomputer 51 has the energization control unit 53 that controls energization of the motor winding 11, and the energization state notification unit 54 that outputs an energization state signal according to an energization command state. The failure determination IC 60 is provided separately from the main microcomputer 51, and has the abnormality monitoring unit 65 that monitors an abnormality based on the detection value of the current sensor 45 and the energization state signal output from the main microcomputer 51 so as to preform fail-safe measures according to the monitoring result. Since the failure determination IC 60 provided separately from the main microcomputer 51 monitors abnormality, the appropriate fail-safe measures can be taken even when the abnormality occurs in the main microcomputer 51.

When the current sensor 45 is detecting the energization of the motor winding 11 and the energization state signal is not a command to energize the motor winding 11, the failure determination IC 60 cuts off the energization of the motor winding 11 by turning off the current cutoff unit 42 based on a command from the failure determination IC 60. As a result, unintended energization can be quickly cut off. Further, when applied to the shift-by-wire system 1, it is possible to prevent the range from being unintentionally switched.

Second Embodiment

Figure 5:
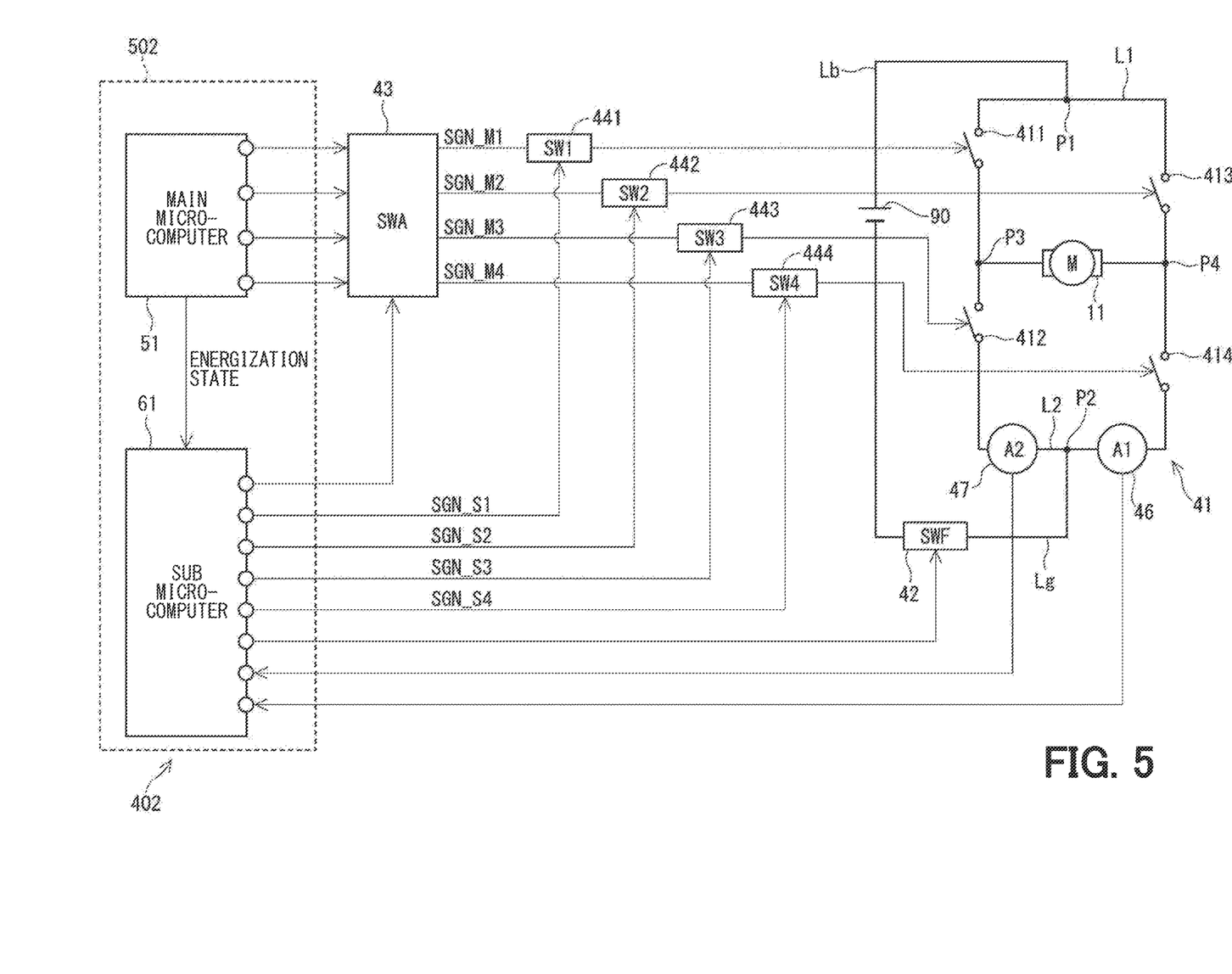
FIG. 5 is a circuit diagram showing a shift range control device according to a second embodiment.
Figure 6:
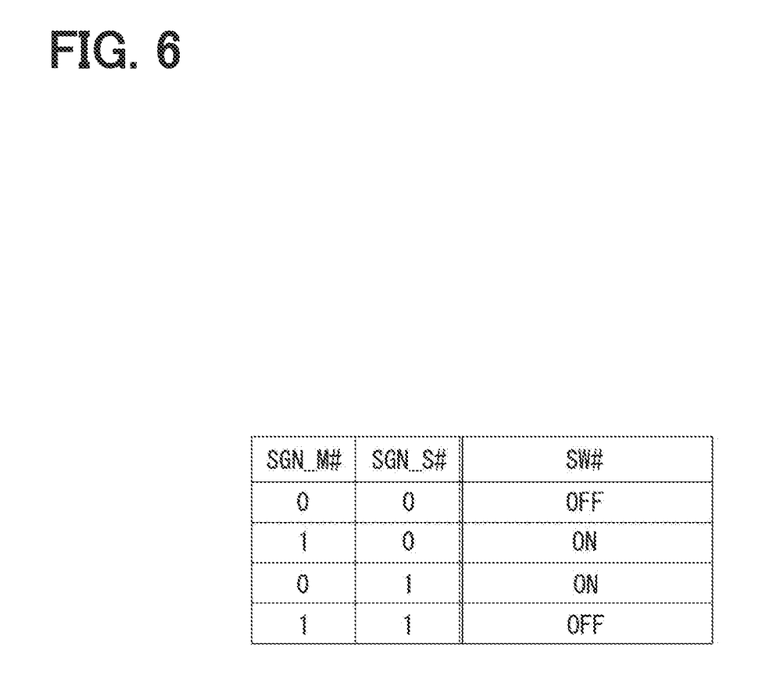
FIG. 6 is an explanatory diagram illustrating on/off control of a signal switching unit according to the second embodiment.
Figure 7:
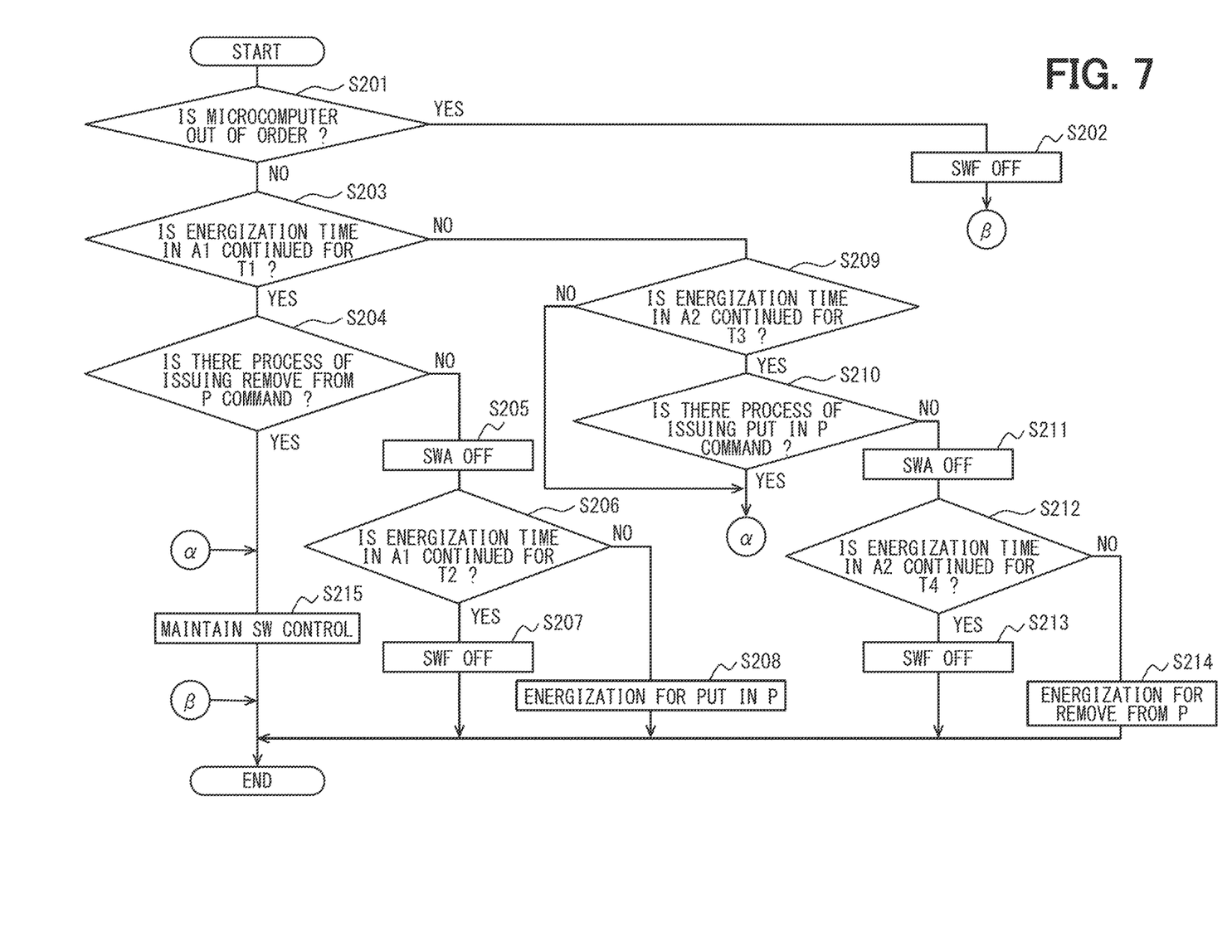
FIG. 7 is a flowchart illustrating an abnormality monitoring process according to the second embodiment.

A second embodiment is shown in FIGS. 5 to 7. As shown in FIG. 5, the shift range control device 402 includes a drive circuit unit 41, a current cutoff unit 42, a signal cutoff unit 43, signal switching units 441 to 444, current sensors 46, 47, a control unit 502, and the like. The control unit 502 has a main microcomputer 51 and a sub microcomputer 61. Similar to the failure determination IC 60, the sub microcomputer 61 has a current acquisition unit 62, an abnormality monitoring unit 65, and a switch control unit 66. The current acquisition unit 62, the abnormality monitoring unit 65, and the switch control unit 66 are not shown in FIG. 5. Further, in the figure, the current cutoff unit 42 is described as "SWF", the signal cutoff unit 43 is described as "SWA", and the signal switching units 441 to 444 are described as "SW1 to SW4".

The on/off operation of the signal cutoff unit 43 and the signal switching units 441 to 444 is controlled by the main microcomputer 51 and the switch control unit 66 of the sub microcomputer 61. The signal cutoff unit 43 is turned on in the normal state and turned off by the sub microcomputer 61 in the case of abnormal energization. When the signal cutoff unit 43 is turned on, the command from the main microcomputer 51 is transmitted to the drive elements 411 to 414 via the signal switching units 441 to 444. As a result, the on/off operation of the drive elements 411 to 414 is controlled by the main microcomputer 51. Further, when the signal cutoff unit 43 is turned off, the command transmission from the main microcomputer 51 to the drive elements 411 to 414 side is cut.

The signal switching units 441 to 444 are configured so that the on/off operation is controlled by the main microcomputer 51 in the normal state, and the on/off operation can be controlled by the sub microcomputer 61 in a case of abnormal energization. The operation of the signal switching units 441 to 444 will be described with reference to FIG. 6. In the on/off switching of the signal switching units 441 to 444, the commands from the main microcomputer 51 side are referred to as SGN_M1 to SGN_M4, and the commands from the sub microcomputer 61 side are referred to as SGN_S1 to SGN_S4. The "1" to "4" at the end correspond to the signal switching units 441 to 444, respectively, and are described as "#" in FIG. 6. Further, an ON command is set to "1" and an OFF command is set to "0". Hereinafter, the on/off operation of the signal switching unit 441 will be described as an example. The signal switching units 442 to 444 may be replaced with the parts corresponding to "#", and thus the description thereof will be omitted.

When both the commands SGN_M1 and SGN_S1 are off commands, the signal switching unit 441 is turned off. When one of the commands SGN_M1 and SGN_S1 is an ON command and the other is an OFF command, the signal switching unit 441 is turned on.

In the present embodiment, in the normal state, the sub microcomputer 61 always sets the command SGN_S1 to the off command. As a result, the on/off operation of the signal switching unit 441 is controlled by the command SGN_M1 from the main microcomputer 51. On the other hand, in the case of abnormal energization, the sub microcomputer 61 turns off the signal cutoff unit 43 so that the transmission of the command SGN_M1 to the signal switching unit 441 side is cut. When the signal cutoff unit 43 is turned off, the command SGN_M1 output to the signal switching unit 441 becomes an off command. As a result, the on/off operation of the signal switching unit 441 is controlled by the command SGN_S1 from the sub microcomputer 61.

That is, since the command SGN_S1 is an off command in the normal state and the command SGN_M1 is an off command in the case of abnormal energization, it is not assumed that both the commands SGN_M1 and SGN_S1 are the ON commands. Therefore, when both the commands SGN_M1 and SGN_S1 are the ON commands, the signal switching unit 441 is turned off because it is in an abnormal state.

Returning to FIG. 5, the first current sensor 46 is provided at a position where a current flows during a forward rotation of the motor 10 and no current flows during a reverse rotation, and detects the current during the forward rotation of the motor 10. Specifically, the first current sensor 46 is provided on the drive element 414 side from the connection point P2 of the low potential side connection line L2. The second current sensor 47 is provided at a position where a current flows when the motor 10 rotates in the reverse direction and does not flow when the motor 10 rotates in the forward direction, and detects the current when the motor 10 rotates in the reverse direction. Specifically, the second current sensor 47 is provided on the drive element 412 side of the connection point P2 of the low potential side connection line L2. Thereby, the rotation direction of the motor 10 can be detected based on the detected values of the current sensors 46 and 47. In the figure, the first current sensor 46 is referred to as A1 and the second current sensor 47 is referred to as A2.

The energization state notification unit 54 notifies the sub microcomputer 61 of an energization command signal corresponding to the energization command state of the main microcomputer 51. In the present embodiment, an energization command signal is formed so that the rotation direction of the motor 10 can be determined. Specifically, when a put in P command for rotating the motor 10 in the forward direction is given, the duty is set to a value Y1 (for example, 30%), and when the motor 10 is instructed to turn off the power, the duty is set to a value Y2 (for example, 60%). When a remove from P command for rotating the motor 10 in the reverse direction, the duty is set to the value Y3 (for example, 90%), and when the microcomputer failure occurs, the duty is set to the value Y4 (for example, 0% or 100%).

The abnormality monitoring process according to the present embodiment will be described with reference to the flowchart in FIG. 7. This process is executed by the sub microcomputer 61 at a predetermined cycle. In S201, the sub microcomputer 61 determines whether or not the main microcomputer 51 is out of order. Here, when the duty of the energization state signal is the value Y4, it is determined that the main microcomputer 51 is out of order. When it is determined that the main microcomputer 51 is out of order (S201: YES), that is, when the duty of the communication state signal is the value Y4, the process proceeds to S202 and the current cutoff unit 42 is turned off. When it is determined that the main microcomputer 51 has not failed (S201: NO), that is, when the duty of the communication state signal is other than the value Y4, the process proceeds to S203.

In S203, whether the sub microcomputer 61 determines whether the state in which the current in the forward direction flows through the motor winding 11 continues for a continuation determination time T1 or more based on the current detection signal acquired from the first current sensor 46. The continuation determination time T1 is set to an arbitrary time, which is shorter than the time required for range switching, and is such that erroneous determination due to noise or the like does not occur, as in the continuation determination time T of the above embodiment. Further, the continuation determination time T1 may be equal to or different from the times T2 to T4 described later. When it is determined that the energization time in which the current in the motor winding 11 is flowing in the forward direction is less than the continuation determination time T1 (S203: NO), the process proceeds to S209. When it is determined that the energization time in which the current in the motor winding 11 is flowing in the forward direction is equal to or longer than the continuation determination time T1 (S203: YES), the process proceeds to S204.

In S204, the sub microcomputer 61 determines whether or not the main microcomputer 51 is in the process of issuing the remove from P command. When it is determined that the main microcomputer 51 is in the process of issuing the remove from P command (S204: YES), that is, when the duty of the communication state signal is the value Y3, the energization is intended. Therefore, the process proceeds to S215 and the switch control state is maintained. Specifically, the current cutoff unit 42 and the signal cutoff unit 43 are turned on, and the control of the drive elements 411 to 414 by the main microcomputer 51 is continued. When it is determined that the main microcomputer 51 is not in the process of issuing the remove from P command (S204: NO), that is, when the duty of the communication status signal is other than the value Y3, the process proceeds to S205. In S205, the sub microcomputer 61 determines that an unintended energization different from the command of the main microcomputer 51 is occurring, and turns off the signal cutoff unit 43.

In S206, whether the sub microcomputer 61 determines whether the state in which the current in the forward direction flows through the motor winding 11 continues for a continuation determination time T2 or more based on the current detection signal acquired from the first current sensor 46. When it is determined that the energization time in which the current in the motor winding 11 is flowing in the forward direction is less than the continuation determination time T2 (S206: NO), the process proceeds to S208. When it is determined that the energization time in which the current in the motor winding 11 is flowing in the forward direction is equal to or longer than the continuation determination time T2 (S206: YES), the process proceeds to S207.

In S207, since the current continues to flow in the motor winding 11 even though the signal cutoff unit 43 is turned off, the sub microcomputer 61 determines that a wiring failure has occurred. After that the sub microcomputer 61 turns off the current cutoff unit 42, and cuts off the energization to the motor winding 11.

Even though the command from the main microcomputer 51 is not the remove from P command, when the energization in the P removal direction (that is, the forward rotation direction) is continued for the continuation determination time T1 or more, and when the energization to the motor winding 11 can be cut off by turning off the signal cutoff unit 43 by the command of the sub microcomputer 61, the process proceeds to S208. In S208, in order to avoid unintended range switching, energization control is performed so that the detent roller 26 moves in the put in P direction according to the command of the sub microcomputer 61. Specifically, by turning on the signal switching units 442 and 443, the drive elements 412 and 413 are turned on, and a current in the reverse rotation direction is passed through the motor winding 11. The sub microcomputer 61 turns off the drive elements 412 and 413 by turning off the signal switching units 442 and 443 after passing a current in the reverse direction through the motor winding 11 over the return time T5, so that the energization ends. The return time T5 is set according to the time required for the put in P.

When it is determined that the energization time in which the current in the motor winding 11 is flowing in the forward direction is less than the continuation determination time T1 (S203: NO), the process proceeds to S209. In S209, the sub microcomputer 61 determines whether the state in which the current in the reverse direction flows through the motor winding 11 continues for the continuation determination time T3 or more based on the current detection signal acquired from the second current sensor 47. When it is determined that the energization time in which the current in the motor winding 11 in the reverse direction is less than the continuation determination time T3 (S209: NO), the motor winding 11 is in the non-energized state, so the process proceeds to S215 and the switch control state is maintained. That is, the current cutoff unit 42 and the signal cutoff unit 43 are turned on, and the control by the main microcomputer 51 is continued. When it is determined that the energization time in which the current in the motor winding 11 is flowing in the reverse direction is equal to or longer than the continuation determination time T3 (S209: YES), the process proceeds to S210.

In S210, the sub microcomputer 61 determines whether or not the main microcomputer 51 is in the process of issuing the put in P command. When it is determined that the main microcomputer 51 is in the process of issuing the put in P command (S210: YES), that is, when the duty of the communication state signal is the value Y1, the energization is intended. Therefore, the process proceeds to S215 and the switch control state is maintained. Specifically, the current cutoff unit 42 and the signal cutoff unit 43 are turned on, and the control of the drive elements 411 to 414 by the main microcomputer 51 is continued. When it is determined that the main microcomputer 51 is not in the process of issuing the put in P command (S210: NO), that is, when the duty of the communication status signal is other than the value Y1, the process proceeds to S211. In S211, the sub microcomputer 61 determines that an unintended energization different from the command of the main microcomputer 51 is occurring, and turns off the signal cutoff unit 43.

In S212, whether the sub microcomputer 61 determines whether the state in which the current in the reverse direction flows through the motor winding 11 continues for a continuation determination time T4 or more based on the current detection signal acquired from the second current sensor 47. When it is determined that the energization time in which the current in the motor winding 11 is flowing in the reverse direction is less than the continuation determination time T4 (S212: NO), the process proceeds to S214. When it is determined that the energization time in which the current in the motor winding 11 is flowing in the reverse direction is equal to or longer than the continuation determination time T4 (S212: YES), the process proceeds to S213.

In S213, since the current continues to flow in the motor winding 11 even though the signal cutoff unit 43 is turned off, the sub microcomputer 61 determines that a wiring failure has occurred. After that the sub microcomputer 61 turns off the current cutoff unit 42, and cuts off the energization to the motor winding 11.

Even though the command from the main microcomputer 51 is not the put in P command, when the energization in the put in P direction (that is, the reverse rotation direction) is continued for the continuation determination time T3 or more, and when the energization to the motor winding 11 can be cut off by turning off the signal cutoff unit 43 by the command of the sub microcomputer 61, the process proceeds to S214. In S214, in order to avoid unintended range switching, energization control is performed so that the detent roller 26 moves in the remove from P direction according to the command of the sub microcomputer 61. Specifically, by turning on the signal switching units 441 and 444, the drive elements 411 and 414 are turned on, and a current in the forward rotation direction is passed through the motor winding 11. The sub microcomputer 61 turns off the drive elements 411 and 414 by turning off the signal switching units 441 and 444 after passing a current in the forward direction through the motor winding 11 over the return time T6, so that the energization ends. The return time T6 is set according to the time required for the remove from P. The return times T5 and T6 may be equal or different.

The process of S206 may be omitted, and after the signal cutoff unit 43 is turned off, the energization state may not be determined and the energization for the put in P may be performed. Similarly, the process of S212 may be omitted, and after the signal cutoff unit 43 is turned off, the energization state determination may not be performed and the energization for the remove from P may be performed.

In the present embodiment, the signal cutoff unit 43 and the signal switching units 441 to 444 are provided, and when the signal cutoff unit 43 is turned off in the abnormal state of the main microcomputer 51, the sub microcomputer 61 can control the on/off operation of the drive elements 411 and 414. When an unintended energization is detected, the detent roller 26 is driven in the returning direction by flowing a current in the opposite direction based on the command of the sub microcomputer 61. As a result, it is possible to prevent the range from being switched unintentionally, and the original range can be maintained.

The shift range control device 402 includes the signal cutoff unit 43 capable of cutting off on/off commands from the main microcomputer 51 to all the drive elements 411 to 414 of the drive circuit unit 41 by the sub microcomputer 61. The current sensors 46 and 47 can detect an energization direction of the motor current Im.

When the sub microcomputer 61 detects an abnormality in rotation direction mismatch where the rotation direction of the motor 10 according to the energization direction of the motor current Im detected by the current sensors 46 and 47 and the rotation direction of the motor 10 according to the energization state signal do not match, the sub microcomputer 61 turns off the signal cutoff unit 43 by the command thereof so as to cut off the motor current Im.

Further, when the sub microcomputer 61 cannot cut off the motor current Im by turning off the signal cutoff unit 43, the sub microcomputer 61 cuts off the motor current Im by turning off the current cutoff unit 42. This makes it possible to prevent the motor 10 from rotating in an unintended direction. When applied to the shift-by-wire system 1, it is possible to prevent the occurrence of erroneous range switching.

The shift range control device 402 is provided for each drive element 411 to 414, and includes signal switching units 441 to 444 that can switch between turning the drive elements 411 to 414 on and off by the command of the main microcomputer 51 and turning them on and off by the command of the sub microcomputer 61. When the sub microcomputer 61 detects the abnormality in the rotation direction mismatch, the sub microcomputer 61 controls the switching units 441 to 444 so that the rotation direction of the motor 10 is opposite to the rotation direction when the abnormality in the rotation direction mismatch is detected with the signal cutoff unit 43 turned off. Thereby, for example, when applied to the shift-by-wire system 1, the range before energization of the motor 10 can be maintained, and unintended range switching can be prevented.

In the embodiment, the shift range control devices 401 and 402 correspond to "abnormality monitoring apparatuses", the current sensors 45 to 47 correspond to "current detection units", the main microcomputer 51 correspond to "first control unit", and the failure determination IC 60 or sub microcomputer 61 corresponds to "second control unit".

Other Embodiments

In the above embodiments, the energization state notification unit notifies the second control unit of the energization command state by changing the duty according to the energization command state. In another embodiment, for example, a plurality of signal lines may be provided and an on/off signal corresponding to the energization command state may be output, that is, the energization command state may be notified by a method other than the duty change.

In the above embodiments, the motor is the motor having brushes and the drive circuit is an H-bridge circuit. In another embodiment, the motor may be a motor other than the motor with brushes, for example, a switched reluctance motor, a DC brushless motor, or the like. Further, the drive circuit may be provided according to the circuit configuration of the motor.

In the embodiments described above, the detent plate is provided with two recesses. In another embodiment, the number of recesses is not limited to two, and for example, a recess may be provided for each range. The shift range switching mechanism and the parking lock mechanism or the like may be different from those in the embodiments described above.

In the above embodiments, the speed reducer is placed between the motor shaft and the output shaft. Although the detail of the speed reducer is not mentioned in the above embodiment, the speed reducer may have any configuration, such as one using a cycloid gear, a planetary gear, or a spur gear that transmits a torque from a speed reduction mechanism substantially coaxial with the motor shaft to the drive shaft, and one using these gears in combination. As another embodiment, the speed reducer between the motor shaft and the output shaft may be omitted, or a mechanism other than the speed reducer may be provided.

The control circuit and method described in the present disclosure may be implemented by a special purpose computer which is configured with a memory and a processor programmed to execute one or more particular functions embodied in computer programs of the memory. Alternatively, the control circuit described in the present disclosure and the method thereof may be realized by a dedicated computer configured as a processor with one or more dedicated hardware logic circuits. Alternatively, the control circuit and method described in the present disclosure may be realized by one or more dedicated computer, which is configured as a combination of a processor and a memory, which are programmed to perform one or more functions, and a processor which is configured with one or more hardware logic circuits. The computer programs may be stored, as instructions to be executed by a computer, in a tangible non-transitory computer-readable medium. The present disclosure is not limited to the embodiment described above but various modifications may be made within the scope of the present disclosure.

The present disclosure has been made in accordance with the embodiments. However, the present disclosure is not limited to this embodiment and structure. This disclosure also encompasses various modifications and variations within the scope of equivalents. Furthermore, various combination and formation, and other combination and formation including one, more than one or less than one element may be made in the present disclosure.

The invention claimed is:

1. An abnormality monitoring apparatus that monitors an energization abnormality of a motor having a motor winding, comprising:
a drive circuit unit configured to switch an energization to the motor winding;

a current detection unit configured to detect a motor current, which is a current flowing through the motor winding;

a current cutoff unit configured to cut off the motor current;

a first control unit having an energization control unit configured to control energization of the motor winding and an energization state notification unit configured to output an energization state signal according to an energization command state;

a second control unit provided separately from the first control unit and having an abnormality monitoring unit configured to monitor an abnormality based on the energization state signal so as to perform fail-safe measure according to a monitoring result;

a signal cutoff unit configured to block on/off command from the first control unit to all drive elements constituting the drive circuit unit by the second control unit, wherein the current detection unit detects an energization direction of the motor current, and when the second control unit detects an abnormality in rotation direction mismatch where a rotation direction of the motor according to the energization direction of the motor current detected by the current detection unit and a rotation direction of the motor according to the energization state signal do not match, the second control unit turns off the signal cutoff unit by the command thereof so as to cut off the motor current.

2. The abnormality monitoring apparatus according to claim 1, wherein when the current detection unit detects the energization to the motor winding and the energization state signal is not a command to energize the motor winding, the second control unit cuts off the motor current by turning off the current cutoff unit in response to a command from the second control unit.

3. The abnormality monitoring apparatus according to claim 1, further comprising, a signal switching unit provided for each driving element and configured to switch whether the driving element is turned on/off by a command of the first control unit or turned on/off by a command of the second control unit, wherein when the second control unit detects an abnormality in a rotation direction mismatch, the second control unit controls the switching unit so that the rotation direction of the motor is opposite to the rotation direction when the abnormality in the rotation direction mismatch is detected with the signal cutoff unit turned off.

4. The abnormality monitoring apparatus according to claim 1, wherein the second control unit cuts off the motor current by turning off the current cutoff unit when it is impossible to cut off the motor current by turning off the signal cutoff unit.

* * * * *